United States Patent
Jenkins

(10) Patent No.: US 10,588,456 B2
(45) Date of Patent: Mar. 17, 2020

(54) GAS FIRE BOWL

(71) Applicant: BOND MANUFACTURING CO INC, Antioch, CA (US)

(72) Inventor: Cameron Jenkins, Antioch, CA (US)

(73) Assignee: BOND MANUFACTURING CO INC, Antioch, CA (US)

( * ) Notice: Subject to any disclaimer, the term of this patent is extended or adjusted under 35 U.S.C. 154(b) by 748 days.

(21) Appl. No.: 15/212,840

(22) Filed: Jul. 18, 2016

(65) Prior Publication Data

US 2017/0215642 A1 Aug. 3, 2017

(30) Foreign Application Priority Data

Feb. 1, 2016 (CN) .................... 2016 2 00974249 U

(51) Int. Cl.
*A47J 37/07* (2006.01)
*F24C 3/14* (2006.01)

(52) U.S. Cl.
CPC ............. *A47J 37/0763* (2013.01); *F24C 3/14* (2013.01)

(58) Field of Classification Search
CPC ..... A47J 37/0763; A47J 37/0713; F24C 3/14; F24C 3/082; F24C 3/10; F24C 3/022
USPC .......................................... 99/340, 427, 446
See application file for complete search history.

(56) References Cited

U.S. PATENT DOCUMENTS

| 4,788,962 A * | 12/1988 | Mashburn | A47J 37/0713 126/25 R |
| 6,520,174 B1 * | 2/2003 | Scigliuolo | A47J 37/0786 126/25 R |
| 6,705,209 B2 * | 3/2004 | Yang | A47J 27/0802 219/440 |
| 2002/0069866 A1 * | 6/2002 | DeMars | A47J 37/0704 126/38 |
| 2015/0114238 A1 * | 4/2015 | Palermo | A47J 37/0623 99/401 |
| 2016/0135645 A1 * | 5/2016 | Walters | A47J 37/0786 126/25 R |
| 2016/0255998 A1 * | 9/2016 | Feng | A47J 37/0713 |

* cited by examiner

*Primary Examiner* — Dana Ross
*Assistant Examiner* — Joseph W Iskra
(74) *Attorney, Agent, or Firm* — Egbert, McDaniel & Swartz, PLLC

(57) ABSTRACT

A gas fire bowl has a heating portion which includes a pedestal, a fire bowl, a locking lid, a burner fixed in the fire bowl, gas parts communicating with the burner, and ignition parts housed and connected in the fire bowl and close to the burner. A portable BBQ grill portion can be installed on and detached from the fire bowl of the heating portion and the pedestal has a plurality of locking features. The portable BBQ grill portion includes a cooking plate and a grease cup having a pocket and removablely attached to outside of the fire bowl. The locking lid has portable features to cooperate with corresponding features of the fire bowl to make the gas fire bowl hand-held and potable. The device can be used as a gas fire bowl, also can be used as a BBQ grill in one unit with space and cost savings.

8 Claims, 8 Drawing Sheets

GAS FIRE BOWL

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present disclosure relates generally to a gas fire bowl with portable feature, i.e. after the locking lid is locked, the gas fire bowl can be hand-held and portable by lifting the handle of the locking lid, and more particularly to a gas fire bowl serve dual purposes for heating and BBQ grill with removable cooking plate.

2. Description of Related Art Including Information Disclosed Under 37 CFR 1.97 and 37 CFR 1.98.

Heating apparatus have been around for many years and can take any number of different forms including the gas fire bowl, the only function of which is generally to keep warm. With the development of society and the improvement of material living standards, outdoor camping, barbecue, etc have been well received by people. Thus, if there is a gas fire bowl which can combine outdoor heating and BBQ functions in one enclosed unit, it would has a huge market with big potential and wide prospect.

The traditional BBQ apparatus comprising cooking plate is often securely positioned on the heating apparatus via welding, for example, which cannot be detached from the heating apparatus after use. Further, such equipment including a BBQ apparatus and heating apparatus is large and heavy and occupies a large of the space, and the cost of production may stay at a relative high level.

In some applications, the BBQ apparatus may be manufactured separately, and installed on the heating apparatus when using, and detached from the heating apparatus after use, however, the BBQ apparatus and the heating apparatus are often heavy and cannot be moved conveniently from one place to another place, that is to say, both the BBQ apparatus and the heating apparatus are not portable.

Therefore, there is a need for an apparatus which can combine outdoor heating and BBQ functions in one enclosed unit, with space and cost saving, and the BBQ portion can be installed on the heating portion easily, and stored away from the heating portion conveniently, and the heating apparatus and the BBQ apparatus are portable.

BRIEF SUMMARY OF THE INVENTION

The inventors herein have recognized the above-mentioned disadvantages and have developed an apparatus to at least partly solve above-mentioned disadvantages.

In accordance with at least one exemplary embodiment, a gas fire bowl with a portable BBQ grill portion is provided. A gas fire bowl comprises a heating portion which comprises a pedestal; a fire bowl located on the pedestal; a locking lid; a burner fixed in the fire bowl; gas parts communicated to the burner for providing gas to it; and ignition parts housed and connected in the fire bowl, and close to the burner for igniting fire. The gas fire bowl operates in two modes, i.e. BBQ mode and heating mode, and it further comprises a portable BBQ grill portion which can be installed on and detached from the fire bowl of the heating portion and the pedestal has a plurality of locking features, wherein the portable BBQ grill portion comprises: a cooking plate, which can be stowed in the pedestal via the plurality of locking features when not used and can be positioned on the fire bowl of the heating portion when in the BBQ mode; and a grease cup having a pocket, and removablely attached to outside of the fire bowl, and wherein the locking lid has portable features to cooperate with corresponding features of the fire bowl to make the gas fire bowl being lifted by one hand.

In another embodiment of the utility model, the portable features are insertable features underside of the locking lid and the corresponding features are brackets formed at the junction of an upper flange and side wall of the fire bowl such that the locking lid can be locked on the fire bowl, by rotating the locking lid in one direction to slide insertable features under brackets until stopped by stop parts of the brackets.

In another embodiment of the utility model, the gas fire bowl further comprises a grease tube for directing grease, which is communicated with the cooking plate at one end and with the grease cup at the other end.

In another embodiment of the utility model, the gas fire bowl further comprises an external gas tank holder for placing a gas tank.

In another embodiment of the utility model, on the top surface of the cooking plate, there are a rim around its peripheral and a plurality of elongated parallel rids such that channels are formed on the top surface, and characterized in that a drain hole formed through in the cooking plate and in the path of the channels is open to the grease cup through the grease tube.

In still another embodiment of the utility model, the pedestal comprises a base with hollow annular, a plurality of curved connections and an upper element, wherein the plurality of curved connections connect the base and the upper element, and the locking features are pivotally arranged on the base.

In still another embodiment of the utility model, the locking features comprise locking rods, each of which is pivotable about a pivot point on one end, wherein when they are pivoted to the inside of the base, they support the cooking plate, and when they are pivoted to the outside of the base to reveal a passage of the cooking plate.

In still another embodiment of the utility model, the gas parts comprise a gas valve, and a regulator to adjust the flow of the gas.

In still another embodiment of the utility model, the ignition parts comprise an ignition pin and a guard, and wherein the ignition parts close to the burner.

In still another embodiment of the utility model, the adjustment is accomplished by a control knob on the outside of the fire bowl which is connected to the gas parts.

All of these embodiments are capable of being used to provide several advantages. In particular, the utility model can be used as a gas fire bowl, also can be used as a portable BBQ grill portion in one unit with space and cost saving. Additionally, the portable BBQ grill portion may be installed and stored away conveniently with easy steps, that is, unlocking, pick up, put on and store away, and vice versa. Furthermore, the gas fire bowl and BBQ grill portion both are portable via a locking lid for the gas fire bowl.

Additional objects, features, and/or advantages will be set forth in part in the description which follows, and in part will be obvious from the description, or may be learned by practice of the present disclosure. At least some of these objects and advantages may be realized and attained by the elements and combinations particularly pointed out in the disclosure.

BRIEF DESCRIPTION OF THE SEVERAL VIEWS OF THE DRAWINGS

The present disclosure can be understood from the following detailed description, either alone or together with the accompanying drawings. The drawings are included to provide a further understanding of the present disclosure, and are incorporated in and constitute a part of this specification. The drawings illustrate one or more exemplary embodiments of the present teachings and together with the description serve to explain certain principles and operation. In the drawings.

DETAILED DESCRIPTION OF THE INVENTION

Before describing several exemplary embodiments of the utility model, it is to be understood that the utility model is not limited to the details of construction set forth in the following description. The utility model is capable of other embodiments and of being practiced or being carried out in various ways.

Further, it should be understood that this description's terminology is not intended to limit the utility model. For example, spatially relative terms—such as "below", "lower", "above", "upper", and the like—may be used to describe one element's or feature's relationship to another element or feature as illustrated in the figures. These spatially relative terms are intended to encompass different positions (i.e., locations) and orientations (i.e., rotational placements) of a device in use or operation in addition to the position and orientation shown in the figures. For example, if a device in the figures is turned over, elements described as "below" other elements or features would then be "above" the other elements or features. Thus, the exemplary term "below" can encompass both positions and orientations of above and below. A device may be otherwise oriented (rotated 90 degrees or at other orientations) and the spatially relative descriptors used herein interpreted accordingly.

The present description relates to a gas fire bowl with a portable BBQ grill portion. The gas fire bowl can operate in two modes, that is, heating mode and BBQ mode. The portable BBQ grill portion as an independent portion can be assembled on the heating portion of the gas fire bowl, also can be taken away from such heating portion, easy assembly and detach. In another word, the gas fire bowl comprises a heating portion and a portable BBQ grill portion, wherein the heating portion operates in the heating mode, and the combination of the heating and the BBQ grill portions operates in the BBQ mode. As such, dual function (i.e., Heating and BBQ functions) in one unit can save space and cost. Further, the gas fire bowl has portable feature, such as a locking lid, wherein after the locking lid is locked, the gas fire bowl can be hand-held and portable by lifting the handle of the locking lid.

Figure 1:
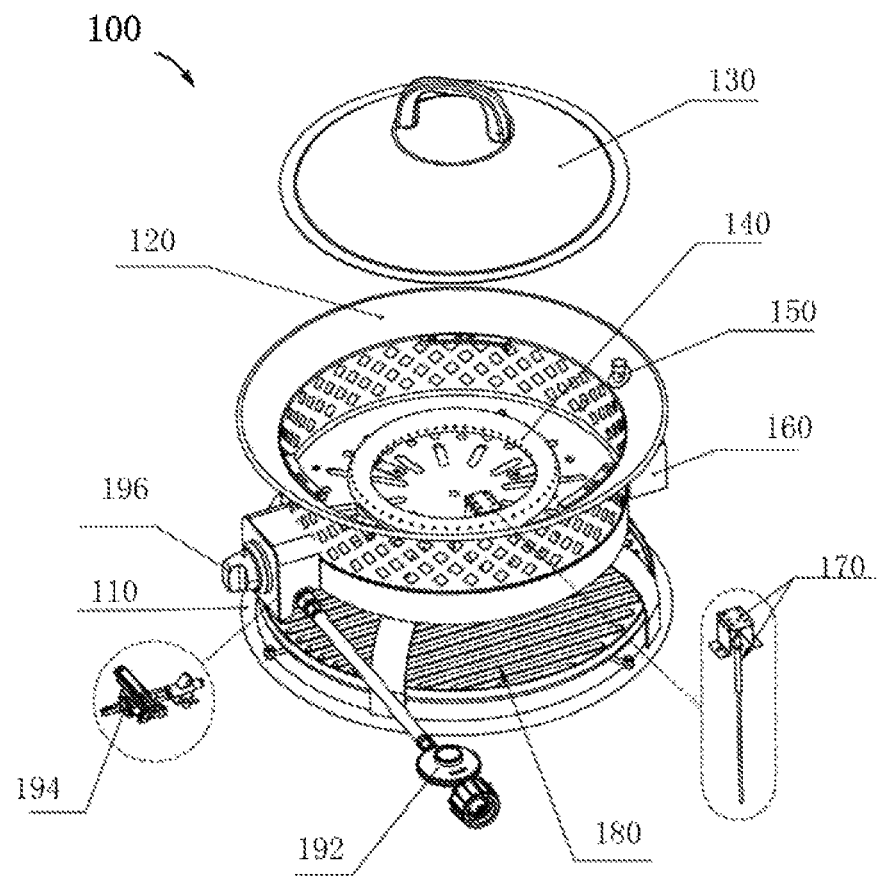
FIG. 1 is a perspective view of a gas fire bowl in the heating mode, in accordance with one embodiment of the utility model.

Referring to the drawings now, FIG. 1 is a perspective view of a gas fire bowl in the heating mode, i.e. the heating portion 100 in accordance with one embodiment of the utility model. In this heating mode, the heating portion 100 may be used to keep warm. In this mode, the cooking plate 180 is not used and may be stowed in the device, such as is supported by the pedestal 110 and underneath the fire bowl 120, such as shown in FIG. 1. Generally, the heating portion 100 comprises a pedestal 110 (shown in FIGS. 2A-2B), a fire bowl 120, a locking lid 130, a burner 140, gas parts (shown in FIG. 7) comprising a gas valve 194 and a regulator 192, and ignition parts 170 comprising a ignition pin and guard. Further it comprise an external gas tank holder (shown in FIG. 8) used for placing gas tank. The gas tank stores the gas and communicates with the gas parts.

Continue with FIG. 1, the pedestal 110 is consisted of a base 111, a plurality of curved connections 113 and an upper element 114, the detailed description of which will be described in FIGS. 2A-2B. The base 111 may be hollow annular or other configurations, and a plurality of locking features 112 are pivotally arranged on the base 111 via fasteners, such as nuts, bolts and the like. The upper element 114 also may be hollow annular or other configurations. The fire bowl 120 is shaped as a bowl, for example, having a bottom 121, side wall 122 and upper flange 123 (shown in FIG. 3). The bottom 121 of the fire bowl 120 is sized to fasten to the upper element 114 of the pedestal 110. In an example, the periphery of the upper element 114 has apertures and a notch by which the gas parts comprising a gas valve and a regulator (shown in FIG. 7) are connected to the periphery of the upper element 114, for example, via fasteners, such as nuts, bolts and the like. A control knob 196 covers and is communicated with the gas valve of the gas parts, thus the gas valve can be controlled by the control knob 196. The fire bowl 120 has a plurality of apertures in the bottom 121, such that the burner 140 can be fixed in the fire bowl 120 via fasteners, such as screw fasteners through these apertures. Further, a plurality apertures and slots formed through the bottom 121 facilitate the air flow to ensure the better combustion. Further, the whole side wall 122 of the fire bowl 120 also has a plurality of apertures to facilitate the air flow. The burner 140 has a structure for connecting with the ignition part 170, so that the ignition pin 171 may be close to the burner 140, such that the burner 140 may be fired when the ignition pin 171 is activated and the gas valve 194 is open. Furthermore, the upper flange 123 of the fire bowl 120 has a hole into which the grease tube 150 may be inserted. A number of brackets 124 are formed at the junction of the upper flange 123 and the side wall 122 and has slots in the top surface, some of which are used to cooperate with the features of the cooking plate, such that the cooking plate can be fixed on the fire bowl when in the BBQ mode. Each of brackets 124 comprises a stop part at one end, such that when the locking lid 130 is placed on the fire bowl 120 with its insertable features 134 (as shown in the FIGS. 12B-F) not overlaid with the brackets 124 and then is rotated in one direction (in this example, clockwise), the insertable features 134 slide under the brackets and stopped by the stop parts respectively, the locking lid 130 is locked on the fire bowl 120 by the cooperation of the brackets 124 and the insertable features 134. When rotated in opposite direction (in this example counter-clockwise) such that the insertable features 134 are not overlaid under the brackets 124, the locking lid 130 is detached from the fire bowl 120.

Figure 2A:
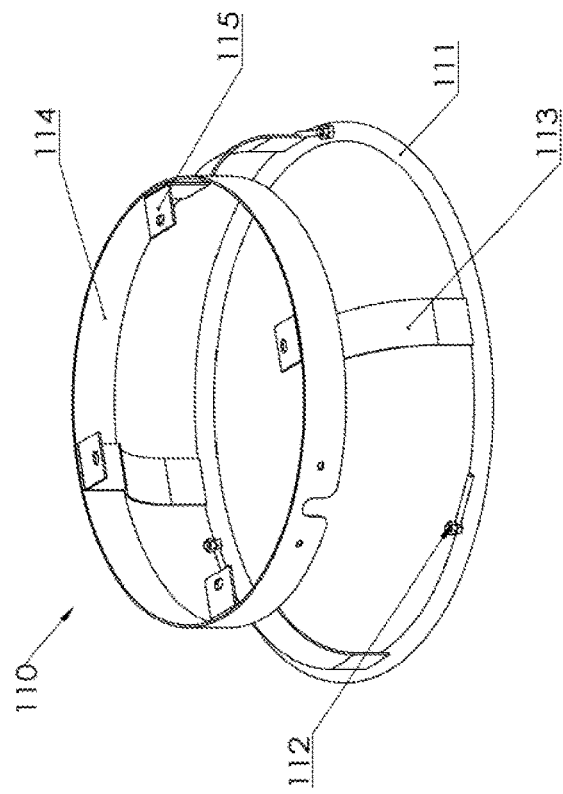
FIG. 2A-2B are perspective views of the pedestal shown in FIG. 1 in a locking mode and unlocking mode, respectively.
Figure 2B:
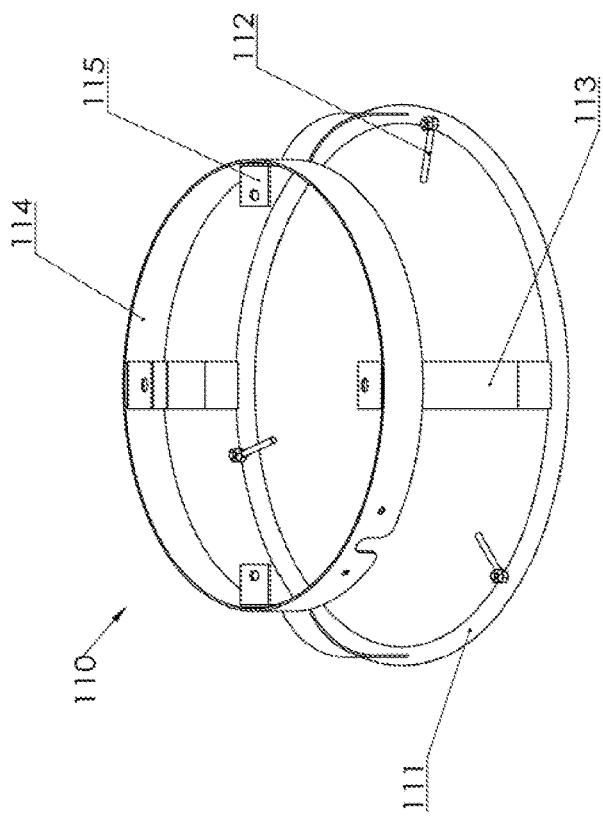

FIGS. 2A-2B shows perspective views of the pedestal 110 shown in FIG. 1 in a locking mode and unlocking mode, respectively. As described above, the pedestal 110 is consisted of a base 111, a plurality of curved connections 113 and an upper element 114, wherein the plurality of curved connections 113 connect the base 111 and the upper element 114. A plurality of locking features 112 are pivotally arranged on the base 111 via fasteners, such as pins, bolts and the like. The locking features 112 comprise elongate rods equally spaced in circumference on the top surface of the base 111, wherein each of the rods can pivot about one end in the horizontal plane. The locking features 112 have two operating modes, that is, locking mode and unlocking mode. In the unlocking mode, such as shown in FIG. 2B, the locking features 112, such as three locking rods, point outwards, that is, not point to the circle defined by the inner diameter of the annular base 111, such that the locking features are out of the way and the cooking plates 180 with an outer diameter smaller than the inner diameter of the annular base 111 can go into the space defined by the base 111, the connections 113 and the upper element 114. It can be seen that the locking features 112 can further pivot outwards, as long as they are out of the passage of the cooking plate 180. After the cooking plate 180 goes into the space and above the plane in which the locking features are arranged, the locking features 112 are pivoted back and point inwards such that they obstruct the passage of the cooking plate 180 and the cooking plate 180 rests on them. With the locking features 112 pointing inwards, it is called the locking mode, such as shown in FIG. 2A. With the cooking plate 180 locked in the pedestal 110 in combination of the locking lid 130 locked on the fire bowl 120, one can lift the entire device in one hand by grasping the handle 131 of the locking lid 130, such that the device is portable. The connections 113 are spaced equally in circumference, and in this embodiment, four connections 113 are spaced 90 degrees from each other. Each connection 113 has four segments, wherein the first lowest segment is flat and vertical, the second segment bends inwards, the third segment is a vertical flat the out side of which is against the inner side of the upper element 114, and the fourth topmost segment bends inwards to form an extension 115 which is flush with the top of the upper element 114. Each of the extension 115 has a hole and the fastener such as bolt is inserted through the hole for connecting the fire bowl 120 to the pedestal 110.

Figure 3:
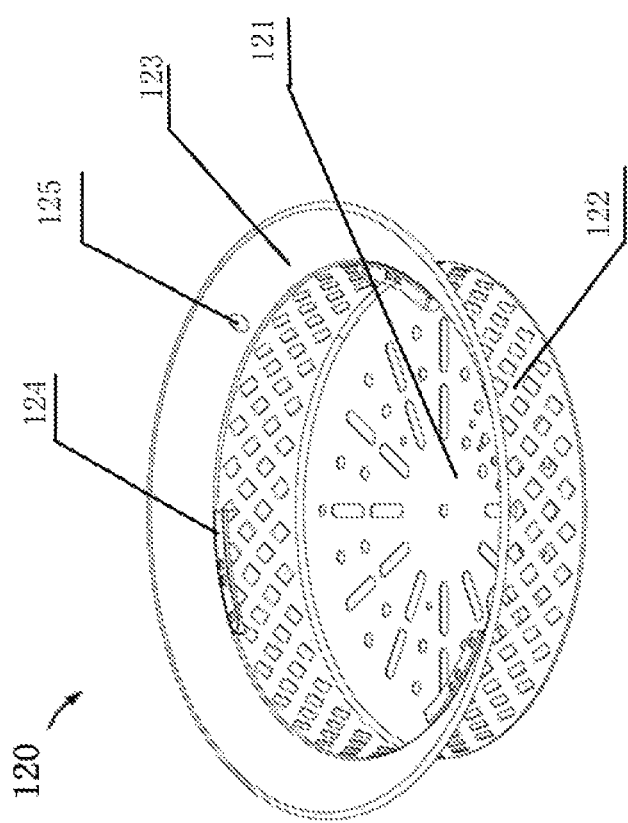
FIG. 3 is a perspective view of the fire bowl shown in FIG. 1.

Now, referring to FIG. 3, a fire bowl 120 shaped as a bowl is shown. As described above, the fire bowl 120 has a bottom 121, side wall 122 and upper flange 123. The bottom 121 and side wall 122 have many apertures and slots therein for facilitating the flow of the air, the shape of which can be selected from circle, rectangle, triangle, ellipse, oval, oblong, and the like and the combination thereof, and the pattern and the size of which can be selected as desired. Further, some of the apertures in the bottom 121 are used for connecting other components, such as the burner 140, the ignition parts, etc, to the fire bowl 120 via the fasteners. Some of the apertures in the side wall 122 are used for connecting with the hooks 162 of the grease cup 160. The orientation, shape and size of the apertures for connecting are determined by their connecting means and their cooperated components. The detailed description of the connection portions 141, 142 will be described in FIG. 5. The upper flange 123 also has a hole 125 into which the grease tube 150 may be inserted. A number of brackets 124 may be fixed, such as by welding, bonding, and the like, to the inside of the fire bowl 120, such as the junction of the upper flange 123 and the side wall 122, for example, or may be integrated with the fire bowl 120 by suitable process technologies known by those skilled in the art. The brackets 124 are spaced equally in circumference, and in this embodiment, three brackets 124 are spaced 120 degrees from each other.

Figure 4:
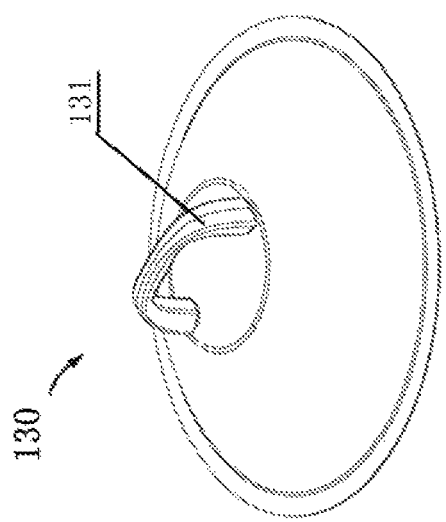
FIG. 4 is a perspective view of the locking lid shown in FIG. 1.

FIG. 4 shows a perspective view of the locking lid shown in FIG. 1. The locking lid 130 is shaped and sized to fit for the upper flange 123 of the fire bowl 120, for example, the locking lid 130 may be a circular form with a handle 131 on the top. In the disclosed embodiment, the locking lid 130 has insertable features (such as insertable features 134 shown in FIGS. 12B-12F) on the underside of the rim of the locking lid 130, which are used to cooperate with the brackets 124 to secure the locking lid 130 onto the fire bowl 120. In the firepit mode, the locking lid 130 may rest on the fire bowl 120 in either locked or unlocked state.

Figure 5:
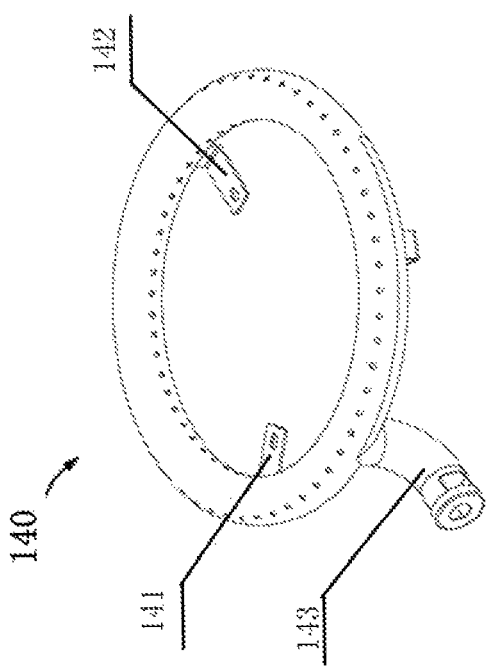
FIG. 5 is a perspective view of the burner shown in FIG. 1.

Turning to FIG. 5, a burner 140 is shown with a generally circular shape, in the disclosed embodiment. The other shapes also may be contemplated. The burner 140 may be formed from high temperature resistant materials, such as alloy steel. The surface of the burner 140 has a plurality of small holes as the outlets of the fuel, which are known by those skilled in the art, not described here in details. The bottom of the burner 140 is provided with a curved pipe 143 which is used to supply the fuel to the burner 140 and may be connected to a gas valve. The gas valve 194 will be described in FIG. 7 in details. Some tabs 141, 142 extend from the bottom of the burner 140 and are used for connecting to the fire bowl 120.

Figure 6:
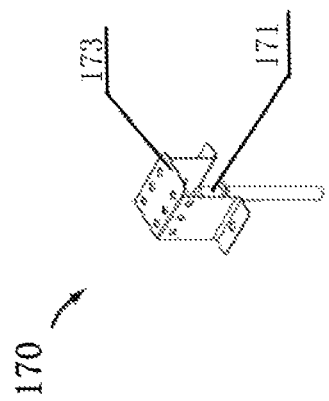
FIG. 6 is a perspective view of the ignition parts having an ignition pin and guard, shown in FIG. 1.

FIG. 6 shows ignition parts shown in FIG. 1. The ignition parts include a guard 173 and an ignition pin 171. The ignition pin 171 may be close to the burner 140, such that the burner 140 may be fired when the ignition pin 171 is activated and the gas valve 194 is open. The guard 173 is used to protect the ignition pin 171 from wind. The guard 173 has a number of holes therein, some of which are used for fasteners such as bolts therethrough to secure the ignition parts to the fire bowl 120, and the other of which are used to allow moderate air flow.

Figure 7:
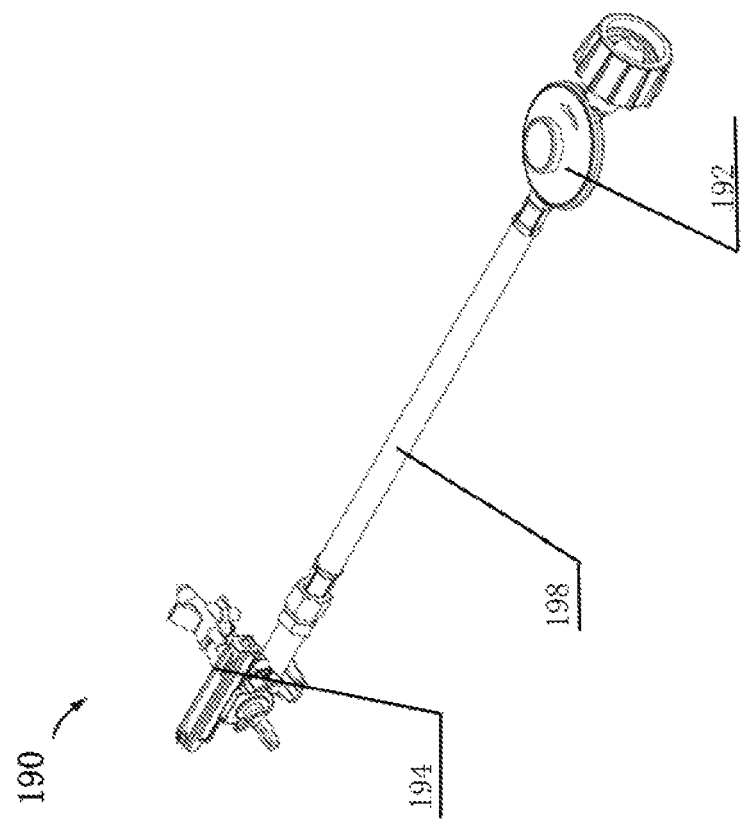
FIG. 7 is a perspective view of the gas parts having a gas valve and regulator, shown in FIG. 1.

FIG. 7 shows gas parts shown in FIG. 1. The gas parts include a gas valve 194 and a regulator 192. The gas valve 194 is connected to the regulator 192 through an air channel 198. The gas parts are connected to the gas tank at one end and to the burner 140 at the other end. When the gas valve is open, the gas may be delivered from the gas tank (not shown in FIGS) to the burner 140 for burning. In the disclosed embodiment, the gas valve may be controlled by a control knob 196. The amount of intake gas may be controlled by controlling the regulator 192.

Figure 8:
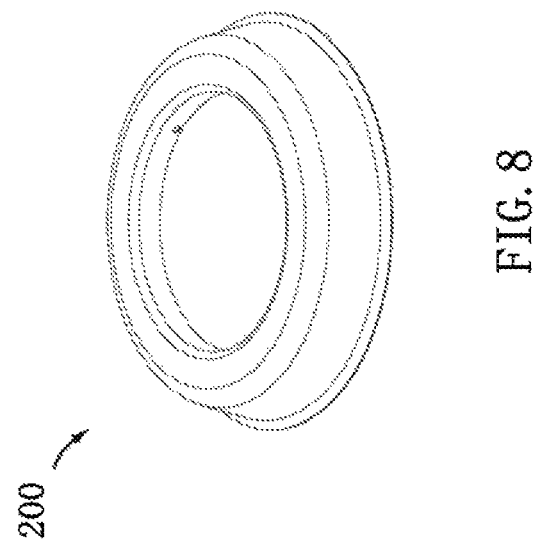
FIG. 8 is a perspective view of an exterior gas tank holder.

FIG. 8 is a perspective view of an exterior gas tank holder 200. The exterior gas tank holder 200 may be shaped and sized to place the gas tank thereon. In one example, the holder 200 may be a base has the shape of hollow truncated cone.

Figure 9:
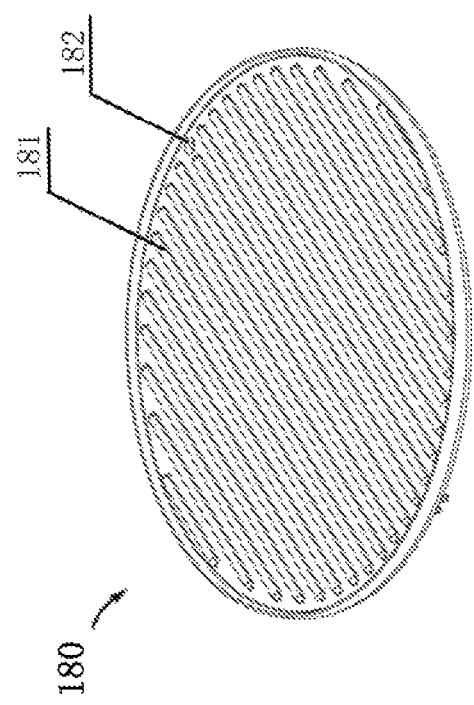
FIG. 9 is a perspective view of the cooking plate shown in FIG. 1.

FIG. 9 shows a cooking plate. The cooking plate 180 is consisted of the high temperature resistant materials of good heat conduction, such as metal. The cooking plate 180 is generally shaped as circular, for example. On the top surface, there are circle rim around the outer peripheral and a plurality of parallel ribs 181 therein. The ribs 181 are separated by equal distance. The ribs 181 and the rim together form the channels to facilitate the flow of the air and the grease. A drain hole 182 formed through the cooking plate 180 is in the path of the channels and open to the grease cup 160 through the grease tube 150 when in the BBQ mode. When BBQ, the grease is directed by the channels to the drain hole 182 into the grease cup 160.

Figure 10:
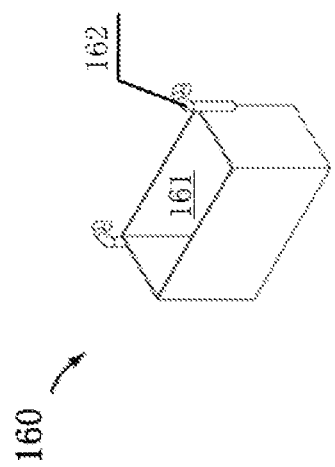
FIG. 10 is a perspective view of the grease cup shown in FIG. 1.

FIG. 10 shows a grease cup shown in FIG. 1. The grease cup 160 has a pocket 161 for receiving the grease, and two hooks 162 attached to the outside of the pocket 161. The grease cup 160 may be directly hooked to the fire bowl 120 via the hook 162, such as shown in FIG. 1. When hooked outside the side wall 122 of the fire bowl 120, one end of the grease tube 150 is inserted through the hole 125 and communicates with the drain hole 182, thereby functioning as a grease inlet; and the other end of the grease tube 150 leads into the grease cup 160, as a grease outlet. With such removable grease cup 160, the cooking plate 180 is cleaner and it is easy to remove the grease from the cooking plate 180 and clean the device.

Figure 11:
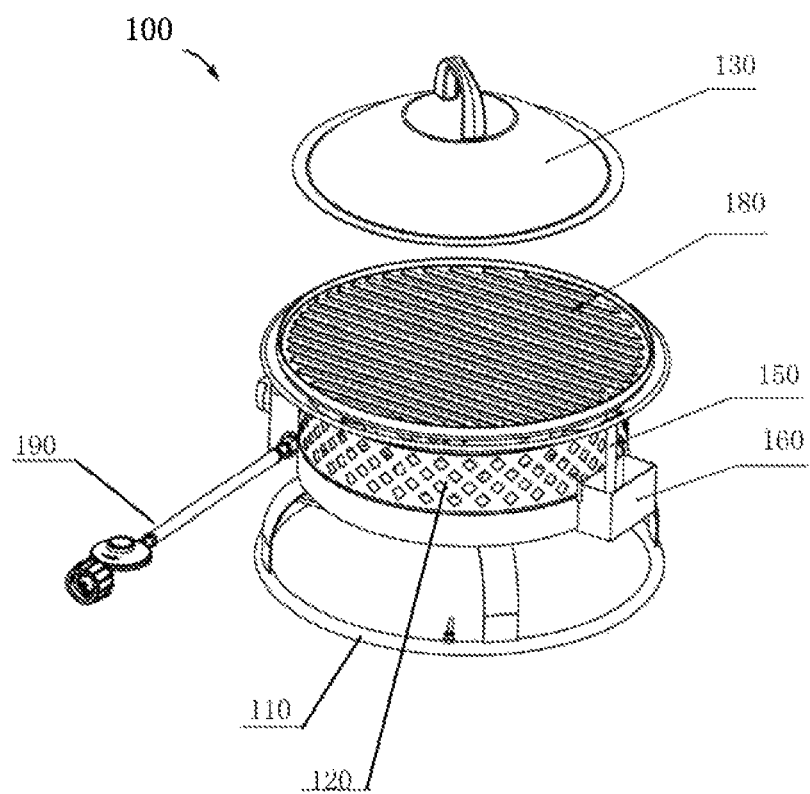
FIG. 11 is perspective view of a gas fire bowl with a portable BBQ grill portion and in the BBQ mode, in accordance with another embodiment of the utility model.
Figure 12A:
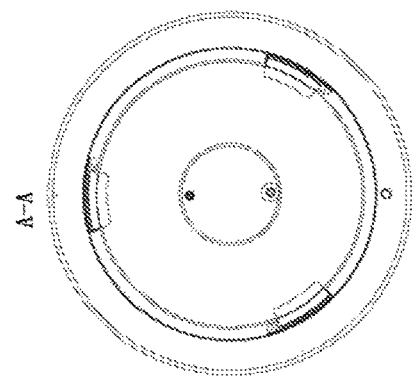
FIGS. 12A-12F show the top view, left view, front view, right view, bottom view, and back view of the locking lid shown in FIG. 4, respectively.
Figure 12B:
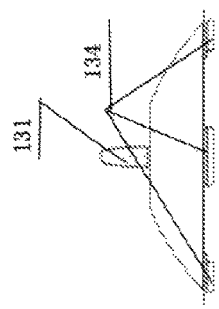
Figure 12C:
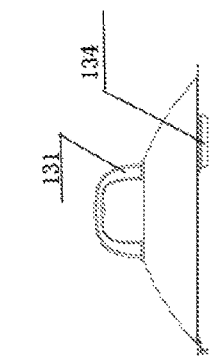
Figure 12D:
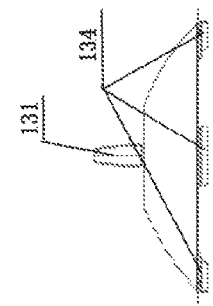
Figure 12E:
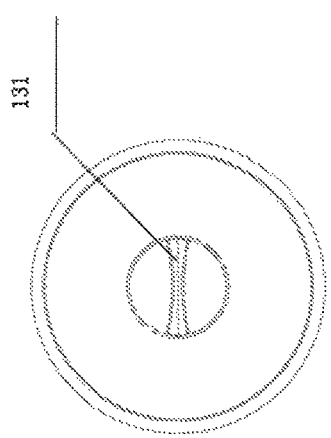
Figure 12F:
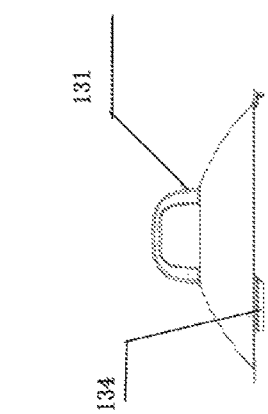

FIG. 11 shows a gas fire bowl in the BBQ mode, in accordance with another embodiment of the utility model. Besides the features discussed above, the portable BBQ grill portion as an independent portion can be assembled on the upper flange of the fire bowl.

Continue with FIG. 11, the cooking plate 180 may be positioned on the fire bowl. In particular, there are some feet at the peripheral on the underside of the cooking plate 180 for inserting into the slots on the brackets 124. The grease cup 160 is located on one outside of the fire bowl via the hooks to receive the grease from the cooking plate 180 through the channels on the cooking plate 180 and the grease tube 330. The portable BBQ grill portion can be installed and stored away conveniently with four easy steps, that is, unlocking, pick up, put on and store away, and vice versa.

FIGS. 12A-12F show the top view, left view, front view, right view, bottom view, and back view of the locking lid, respectively. The portable features of the locking lid can cooperate with the corresponding features of the fire bowl to secure the locking lid onto the fire bowl such that the entire device can be hand-held. For example, in this embodiment, the portable features are insertable features 134 shown on the underside of the rim of the locking lid. Each of these insertable features 134 is attached on the locking lid 130 and comprises flat sheet portion extending parallel to the horizontal such that they are used to cooperate with the brackets of the fire bowl to secure the locking lid onto the fire bowl 120. The specific coordination relationship of the insertable features 134 and the brackets is shown in FIG. 13B. When the locking lid 130 is placed on the fire bowl 120 with its insertable features 134 not overlaid with the brackets 124 and then is rotated in one direction (in this example, clockwise), the insertable features 134 slide under the brackets 124 and stopped by the stop parts of the brackets 124 respectively, such that the locking lid 130 is locked on the fire bowl 120 by the cooperation of the brackets 124 and the insertable features 134. When rotated in opposite direction (in this example counter-clockwise) such that the insertable features 134 are not overlaid under the brackets 124, the locking lid 130 is detached from the fire bowl 120. In this embodiment, it is shown three insertable features 134 spaced by 120 degrees and their corresponding brackets, however, other number of the features and their arrangement also may be contemplated as long as to secure the locking lid onto the fire bowl and make the entire device hand-held and portable.

Figure 13A:
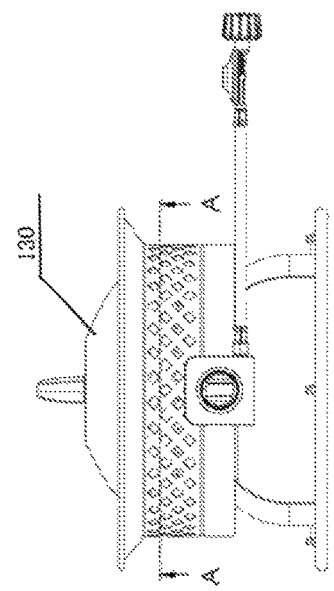
FIG. 13A shows the front view of the gas fire bowl with a locking lid locked on the fire bowl.
Figure 13B:
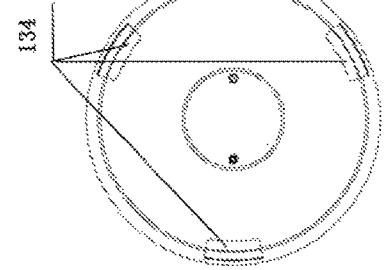
FIG. 13B shows a bottom cross section view A-A of the gas fire bowl along the line shown in FIG. 13A.

As shown in FIG. 13A, the gas fire bowl with a locking lid is locked on the fire bowl. As shown, after the locking lid is locked, the entire gas fire bowl can be hand-held and portable by lifting the handle 131 of the locking lid.

This description and the accompanying drawings that illustrate exemplary embodiments should not be taken as limiting. Various mechanical, structural, and material changes may be made without departing from the scope of this description and the utility model as claimed, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Further, modifications and alternative embodiments will be apparent to those of ordinary skill in the art in view of the disclosure herein. For example, the systems may include additional components that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts may be reversed, and certain features of the present teachings may be utilized independently, all as would be apparent to one skilled in the art after having the benefit of the description herein.

It is to be understood that the particular examples and embodiments set forth herein are non-limiting, and modifications to structure, dimensions, and materials may be made without departing from the scope of the present teachings.

I claim:

1. A heating portion for a gas fire bowl, the heating portion comprising:
   a pedestal having a plurality of locking features, the pedestal comprising:
      a base with a hollow interior, the plurality of locking features pivotally arranged on said base;
      a plurality of curved connections; and
      an upper element, said plurality of curved connections connecting said base and said upper element;
   a fire bowl positioned on said pedestal;
   a locking lid removably secured to said fire bowl so as to allow the gas fire bowl to be lifted by one hand of a user;
   a burner fixedly positioned in said fire bowl;
   a gas system connected to said burner so as to pass a flammable gas to said burner;
   an igniter housed and connected in said fire bowl, said igniter positioned adjacent to said burner and adapted to ignite the flammable gas in said burner;
   a grill detachably mounted to said fire bowl, said grill comprising;
      a cooking plate stowable in said pedestal via the locking features when said cooking plate is not in use and positionable on said fire bowl when deployed, the locking features comprising a plurality of locking rods, each of said plurality of locking rods being pivotable about a pivot point at one end thereof, said plurality of locking rods supporting said cooking plate when said plurality of locking rods are pivoted to an inside of said base and stowing said cooking plate when pivoted outside of said base; and
      a grease cup having a pocket, said grease cup removably attached to an exterior of said fire bowl.

2. The heating portion of claim 1, wherein said locking lid has insert elements on an underside thereof, the heating portion further comprising:
   brackets formed at a junction of an upper flange and side wall of said fire bowl, said brackets each having a stop part, said locking features being rotatable in one direction such that the insert element respectively slides under said brackets until the insert elements are stopped by the stop part of the brackets.

3. The heating portion of claim 1, further comprising:
   a grease tube communicating with said cooking plate at one end and with said grease cup at an opposite end, said grease to adapted to direct grease.

4. The heating portion of claim 1 further comprising:
   an external gas tank holder affixed to said pedestal, said external gas tank holder adapted to receive a gas tank therein.

5. The heating portion of claim 3, wherein said cooking plate has a rim on a top surface and at a periphery thereof, said cooking plate having a plurality of elongated parallel ribs on the top surface thereof, said plurality of elongate parallel ribs defining channels on the top surface of said cooking plate, said cooking plate having a drain hole formed therethrough and open to said grease cup through said grease tube, said drain hole being positioned in a path of the channels.

6. The heating portion of claim 1, said gas system comprising a gas conduit, a gas valve cooperative with said gas conduit so as to control a flow of the flammable gas through said gas conduit, and a regulator cooperating with said gas conduit to adjust a flow of the flammable gas.

7. The heating portion of claim 1, said igniter having an ignition pin and a guard positioned around the ignition pin.

8. The heating portion of claim 6, said regulator comprising a control knob positioned on an exterior of said fire bowl.

* * * * *